United States Patent
Yoneda et al.

(10) Patent No.: US 7,624,832 B2
(45) Date of Patent: Dec. 1, 2009

(54) FRONT AND REAR DRIVE POWER DISTRIBUTION CONTROL DEVICE FOR VEHICLE

(75) Inventors: Takeshi Yoneda, Tokyo (JP); Tatsunori Nagura, Tokyo (JP); Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 586 days.

(21) Appl. No.: 11/448,741

(22) Filed: Jun. 8, 2006

(65) Prior Publication Data
US 2007/0114089 A1 May 24, 2007

(30) Foreign Application Priority Data
Oct. 6, 2005 (JP) .............................. 2005-171557

(51) Int. Cl.
B60K 17/34 (2006.01)
(52) U.S. Cl. ..................................... 180/233
(58) Field of Classification Search .................. 180/233
See application file for complete search history.

(56) References Cited

U.S. PATENT DOCUMENTS

| | | | | |
|---|---|---|---|---|
| 5,224,044 | A * | 6/1993 | Tamura et al. ................. | 701/91 |
| 5,270,930 | A * | 12/1993 | Ito et al. ......................... | 701/69 |
| 5,631,829 | A * | 5/1997 | Takasaki et al. ............... | 701/69 |
| 5,742,917 | A * | 4/1998 | Matsuno ....................... | 701/69 |
| 5,754,967 | A * | 5/1998 | Inoue et al. .................... | 701/54 |
| 6,094,614 | A * | 7/2000 | Hiwatashi ..................... | 701/89 |
| 6,634,451 | B2 * | 10/2003 | Sakakiyama ................. | 180/197 |
| 2002/0045981 | A1 * | 4/2002 | Ichikawa et al. .............. | 701/91 |
| 2002/0107628 | A1 * | 8/2002 | Sakakiyama .................. | 701/89 |
| 2003/0079954 | A1 * | 5/2003 | Murakami et al. ......... | 192/82 T |

FOREIGN PATENT DOCUMENTS

| | | |
|---|---|---|
| EP | 1 232 900 A2 | 8/2002 |
| EP | 1 232 900 A3 | 8/2002 |
| EP | 1 510 715 A1 | 3/2005 |
| EP | 1510715 A1 * | 3/2005 |
| JP | 05221248 | 8/1993 |
| JP | 2004-225716 | 8/2004 |
| JP | 2004225716 | 8/2004 |
| JP | 2004225716 A * | 8/2004 |

OTHER PUBLICATIONS

Extended European Search report corresponding to EP 06 01 1846 dated Oct. 27, 2006.

* cited by examiner

*Primary Examiner*—Lesley D Morris
*Assistant Examiner*—Michael R Stabley
(74) *Attorney, Agent, or Firm*—Smith, Gambrell & Russell, LLP

(57) ABSTRACT

With a drive power distribution control section, limited differential torque correction value TLSDS is estimated and calculated by a limited differential torque correction value calculating section based on input torque TCD. Also, a transfer torque calculating section calculates transfer torque TLSD2 by multiplying input torque sensing transfer torque TLSD1 by vehicle slip angular velocity correction coefficient K(dβ/dt). A transfer torque correction/output section then subtracts limited differential torque correction value TLSDS from the transfer torque TLSD2 to calculate and output transfer torque TLSD. In this way, clutch engaging torque for carrying out front and rear drive power distribution is set with good accuracy, and it is possible to have both high cornering performance and high traction performance.

3 Claims, 4 Drawing Sheets

US 7,624,832 B2

FRONT AND REAR DRIVE POWER DISTRIBUTION CONTROL DEVICE FOR VEHICLE

This application claims benefit of Japanese Application No. 2005-171557 filed on Jun. 10, 2005, the contents of which are incorporated herein by this reference.

BACKGROUND OF THE INVENTION

1. Field of the Invention

The present invention relates to a front and rear drive power distribution control device for a vehicle, provided with a limited slip differential mechanism between front and rear drive shafts.

2. Description of Related Art

Conventionally, on a vehicle provided with a front and rear drive power distribution control device, with respect to vehicle dynamic performance, it is generally known that cornering performance tends to be suppressed and traction performance tends to be improved, if limited differential torque between front and rear drive shafts is increased. Given this situation, for example, Japanese patent laid-open No. 2004-225716 discloses a technique, in a four-wheel-drive vehicle having front and rear drive power distribution control using engaging torque of a clutch, to improve both cornering performance and traction, by estimating torque input from an engine side, and including both a control unit for controlling front and rear drive power distribution based on this input torque and a limited slip differential mechanism between front and rear drive shafts.

However, as disclosed in Japanese patent laid open No. 2004-225716 described above, when including both control unit and limited slip differential mechanism, if a control value is supplied from the control unit without taking into consideration limited differential torque generated in the limited slip differential mechanism, clutch engaging torque for performing overall front and rear drive power distribution is not set accurately, and there is a fear that target vehicle behavior cannot be obtained.

The present invention has been conceived in view of the above described situation, and an object of the present invention is to provide, in a four-wheel-drive vehicle including both a control unit and a limited slip differential mechanism, a front and rear drive power distribution control device that can accurately set clutch engaging torque for carrying out front and rear drive power distribution, and can improve both cornering performance and traction performance.

SUMMARY OF THE INVENTION

A front and rear drive power distribution control device for a vehicle of the present invention comprises clutch means for varying drive power distribution between one front and rear wheels, a limited slip differential mechanism for limiting slip between front and rear drive shafts, engaging torque calculating means for calculating engaging torque of the clutch means depending on parameters representing traveling state of the vehicle, limited differential torque estimating means for estimating limited differential torque generated in the limited slip differential mechanism, and control means for controlling the clutch means based on a torque value that is corrected by subtracting the limited differential torque estimated by the limited differential torque estimating means from the engaging torque calculated by the engaging torque calculating means.

The above and other objects, features and advantages of the invention will become more clearly understood from the following description referring to the accompanying drawings.

DETAILED DESCRIPTION OF PREFERRED EMBODIMENTS

One embodiment of the present invention will be described in the following based on FIG. 1 to FIG. 5.

Figure 1:
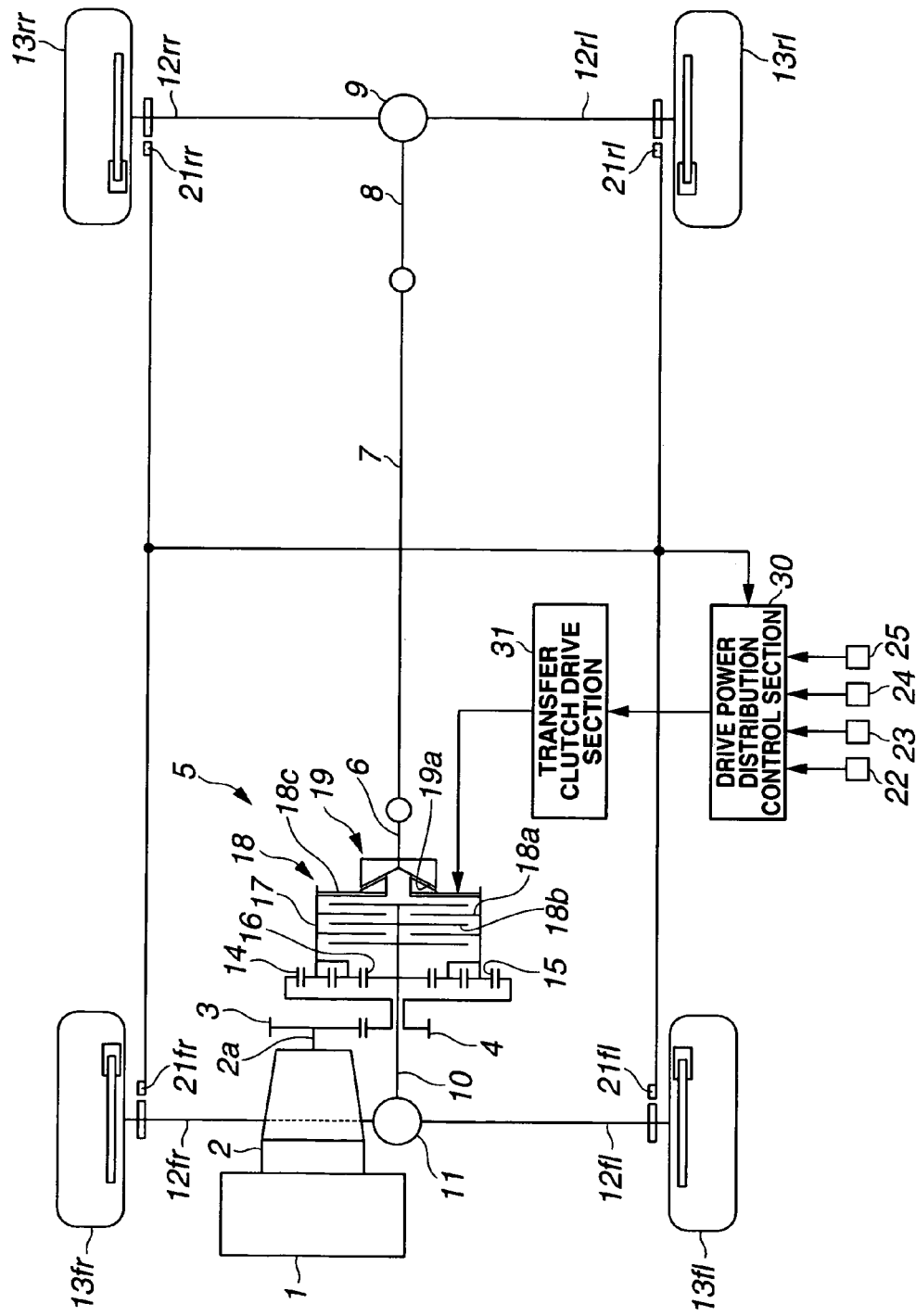
FIG. 1 is an explanatory drawing showing the schematic configuration of an overall drive system of a vehicle.

In FIG. 1, reference numeral 1 represents an engine arranged at a front part of the vehicle, and drive power from the engine 1 is transmitted from an automatic transmission (illustrated also including a torque converter) 2 behind the engine 1, via a transmission output shaft 2a, transfer drive gear 3 and transfer driven gear 4 to a central differential unit 5.

Drive power transmitted to the central differential unit 5 is inputted on the one hand to a rear wheel final reduction unit 9 by way of a rear drive shaft 6, propeller shaft 7 and drive pinion shaft portion 8, and inputted to a front wheel final reduction unit 11 by way of a front drive shaft 10.

The drive power inputted to the rear wheel final reduction unit 9 is transmitted to a rear left wheel 13rl via a rear wheel left drive shaft 12rl, and transmitted to a rear right wheel 13rr via a rear wheel right drive shaft 12rr. Also, the drive power inputted to the front wheel final reduction unit 11 is transmitted to a front left wheel 13fl via a front wheel left drive shaft 12fl, and transmitted to a front right wheel 13fr via a front wheel right drive shaft 12fr.

The center differential unit 5 is comprised of a ring gear 14 integrated with the transfer driven gear 4, and the ring gear 14 meshes with a double planetary gear 15. The front drive shaft 10 extends to the rear and passes through a rotational center of the ring gear 14. The front drive shaft 10 constitutes a sun gear 16 with which the double planetary gear 15 meshes.

The front drive shaft 10 extends further to the rear of the sun gear 16, and a carrier 17 axially supporting the double planetary gear 15 extends to the rear, with a wet-type multiple disc clutch (transfer clutch) 18 being arranged between a rear end side of the front drive shaft 10 and the carrier 17, as clutch means.

The transfer clutch 18 is constructed with outer plates 18a in the inner surface of the carrier 17 and inner plates 18b in the front drive shaft 10 respectively interleaved with each other. The transfer clutch 18 is constructed being pressed by a piston 18c, and the piston 18c is linked to a front end of the rear drive shaft 6 via a limited slip differential mechanism 19. The limited slip differential mechanism 19 is in a dog shape, for example, and is constructed so that pressing force corresponding to differential rotation between the front and rear drive shafts is generated by a cam surface 19a, and limited differential force arises between the front and rear drive shafts.

Further, an electromagnet, not shown, driven by a transfer clutch drive section 31, is provided on the piston 18c, constructed to electronically control pressing force (transfer torque) via the transfer clutch drive section 31 using control signals from the drive power distribution control section 30.

The vehicle is provided with sensors for detecting parameters required for drive power distribution control executed as will be described later by the drive power distribution control section 30. Specifically, vehicle wheel speeds ωfl, ωfr, ωrl, ωrr for each of the vehicle wheels 13fl, 13fr, 13rl, 13rr are detected by vehicle wheel speed sensors 21fl, 21fr, 21rl, 21rr, lateral acceleration actually arising in the vehicle (hereafter referred to as actual lateral acceleration) ($d^2y/dt^2$) is detected by a lateral acceleration sensor 22, yaw rate γ actually arising in the vehicle (hereafter referred to as actual yaw rate) is detected by a yaw rate sensor 23, accelerator opening degree θACC is detected by an accelerator opening degree sensor 24, engine speed NE is detected by an engine speed sensor 25, and these values are inputted to the drive power distribution control section 30.

Based on each of the input signals described above, the drive power distribution control section 30 then calculates front and rear wheel drive power distribution used by the transfer clutch 18 as transfer torque TLSD, and outputs to the transfer clutch drive section 31.

Figure 2:
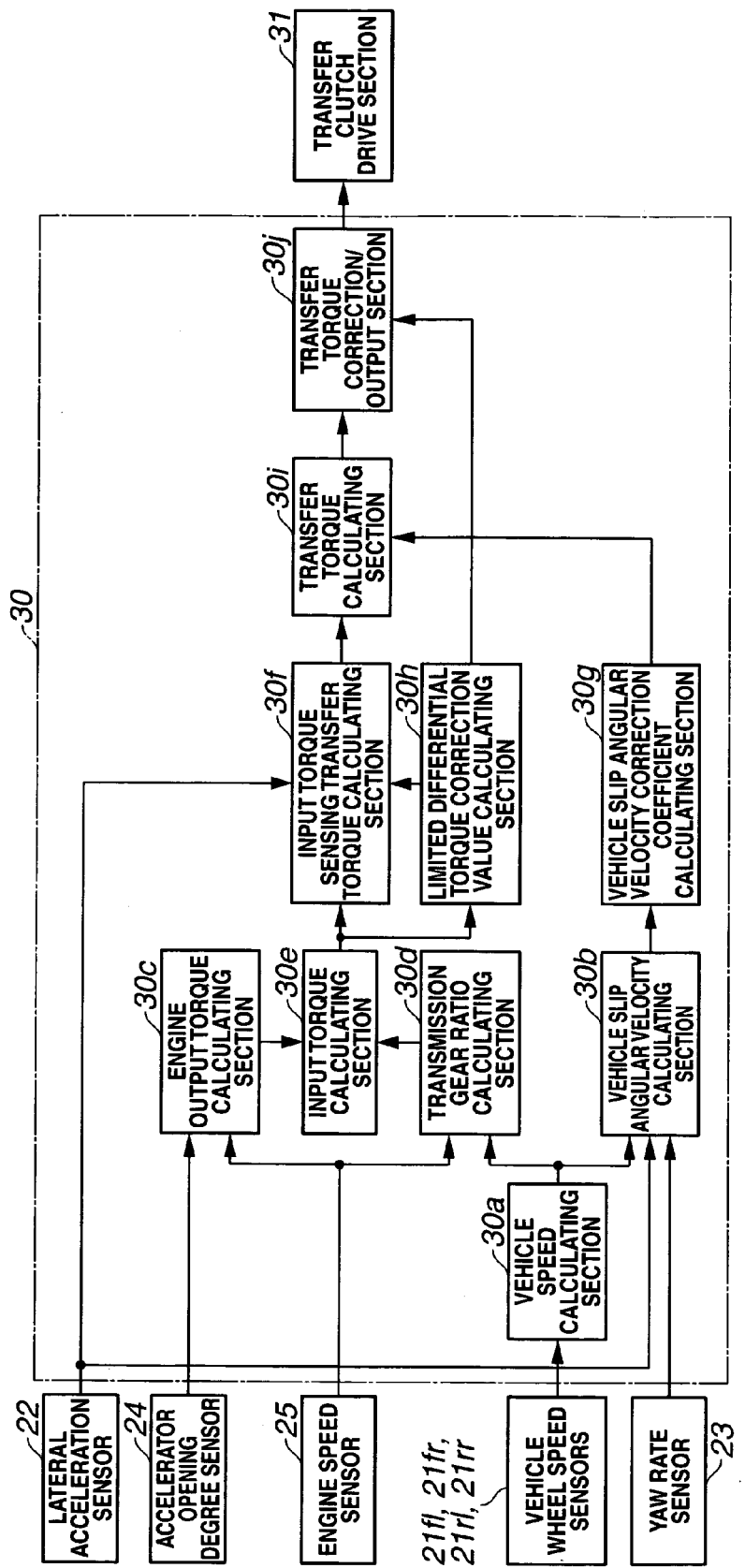
FIG. 2 is a functional block diagram of a drive power distribution control section.

Specifically, as shown in FIG. 2, the drive power distribution control section 30 mainly comprises a vehicle speed calculating section 30a, a vehicle slip angular velocity calculating section 30b, an engine output torque calculating section 30c, a transmission gear ratio calculating section 30d, an input torque calculating section 30e, an input torque sensing transfer torque calculating section 30f, a vehicle slip angular velocity correction coefficient calculating section 30g, a limited differential torque correction value calculating section 30h, a transfer torque calculating section 30i, and a transfer torque correction/output section 30j.

The vehicle speed calculating section 30a receives as inputs wheel speeds ωfl, ωfr, ωrl and ωrr of each of the wheels 13fl, 13fr, 13rl, 13rr from four wheel speed sensors, namely each of the wheel speed sensors 21fl, 21fr, 21rl and 21rr. Vehicle speed V (=(ωfl+ωfr+ωrl+ωrr)/4) is then calculated, for example, by calculating an average of these values, and outputted to vehicle slip angular velocity calculating section 30b and the transmission gear ratio calculating section 30d.

The vehicle slip angular velocity calculating section 30b receives as inputs actual lateral acceleration ($d^2y/dt^2$) from the lateral acceleration sensor 22, and actual yaw rate γ from the yaw rate sensor 23 and vehicle speed V from the vehicle speed calculating section 30a.

Vehicle slip angular velocity (dβ/dt) is then calculated using equation (1) below, and outputted to the vehicle slip angular velocity correction coefficient calculating section 30g.

$$(d\beta/dt)=|((d^2y/dt^2)/V)-\gamma| \quad (1)$$

The engine output torque calculating section 30c receives as inputs the accelerator opening degree θACC from the accelerator opening degree sensor 24, and engine speed NE from the engine speed sensor 25. Based on the accelerator opening degree θACC and the engine speed NE, the engine torque TEG is obtained by referencing a previously provided engine characteristic map, and the engine torque TEG is outputted to the input torque calculating section 30e.

The transmission gear ratio calculating section 30d is inputted with the engine speed NE from the engine speed sensor 25, and vehicle speed V from the vehicle speed calculating section 30a. Transmission gear ratio G TM is then calculated using the following equation (2) and outputted to the input torque calculating section 30e.

$$GTM=(NE \cdot Rt)/((V/3.6) \cdot Gfin) \quad (2)$$

where Rt is tire diameter, and Gfin is final gear ratio.

The input torque calculating section 30e is inputted with engine torque TEG from the engine output torque calculating section 30c, and inputted with transmission gear ratio GTM from the transmission gear ratio calculating section 30d, calculates input torque TCD from equation (3) below, and outputs the calculated input torque to the input torque sensing transfer torque calculating section 30f, and the limited differential torque correction value calculating section 30h.

$$TCD=TEG \cdot GTM \quad (3)$$

The input torque sensing transfer torque calculating section 30f is inputted with actual lateral acceleration ($d^2y/dt^2$) from the lateral acceleration sensor 22, and inputted with input torque TCD from the input torque calculating section 30e. Input torque sensing transfer torque TLSD1 is then calculated based on the actual lateral acceleration ($d^2y/dt^2$) and input torque TCD by referencing a map set in advance using experimentation and calculation etc., and outputs the calculated result to the transfer torque calculating section 30i.

Figure 4:
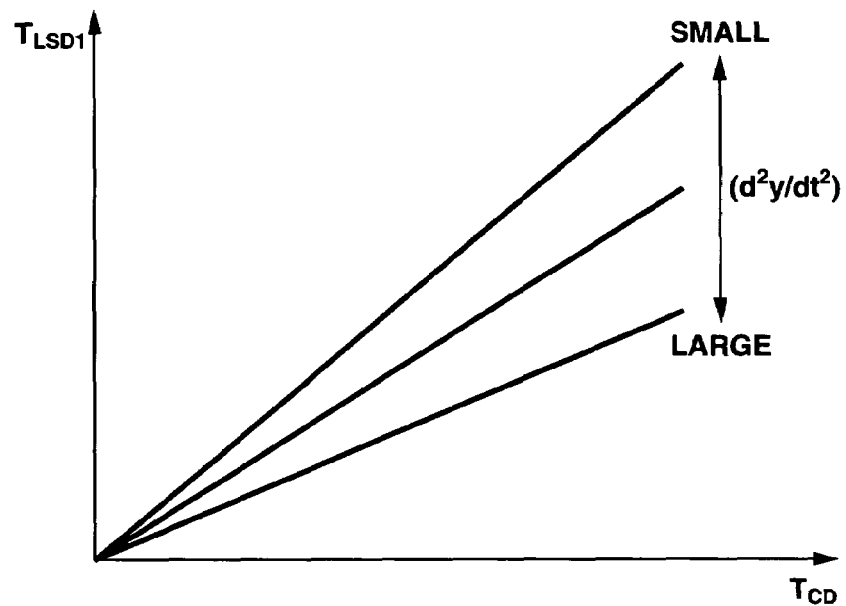
FIG. 4 is a characteristic drawing for input torque sensing transfer torque.

The map for input torque sensing transfer torque TLSD1 is set as shown in FIG. 4, for example, and is high as input torque TCD increases, and low as actual lateral acceleration ($d^2y/dt^2$) increases.

The vehicle slip angular velocity correction coefficient calculating section 30g is inputted with vehicle slip angular velocity (dβ/dt) from the vehicle slip angular velocity calculating section 30b, and calculates vehicle slip angular velocity correction coefficient K(dβ/dt) by referencing a map set in advance using experimentation and calculation etc.

Figure 5:
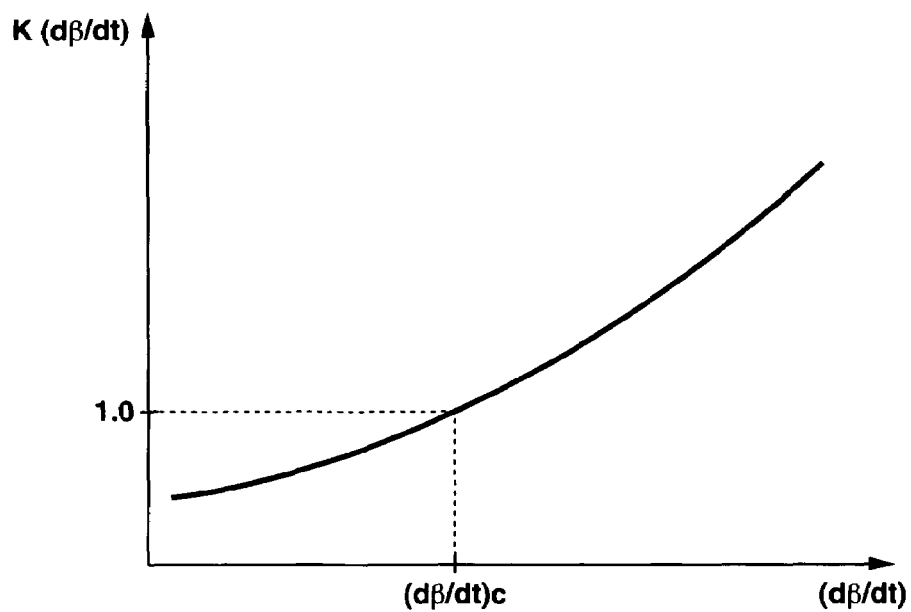
FIG. 5 is a characteristic drawing for vehicle slip angular velocity correction coefficient.

The map for vehicle slip angular velocity correction coefficient K(dβ/dt) is set as shown in FIG. 5, for example, such that as vehicle slip angular velocity (dβ/dt) increases, the coefficient K(dβ/dt) increases. Incidentally, the vehicle slip angular velocity correction coefficient K(dβ/dt) becomes 1.0 with vehicle slip angular velocity (dβ/dt) at (dβ/dt)c, becomes a value smaller than 1.0 in a region where vehicle slip angular velocity (dβ/dt) is smaller than (dβ/dt)c, and becomes a value larger than 1.0 in a region where vehicle slip angular velocity (dβ/dt) is larger than (dβ/dt)c.

The limited differential torque correction value calculating section 30h is provided as limited differential torque estimating means, and is inputted with input torque TCD from the input torque calculating section 30e. A limited differential torque correction value TLSDS is then calculated using equation (4) below, and output to the transfer torque correction/output section 30j.

$$TLSDS=\alpha \cdot TCD \quad (4)$$

where α is a bias ratio for the limited slip differential mechanism 19 obtained in advance through experimentation and calculation etc. Incidentally, the limited differential torque correction value TLSDS does not have to be obtained from equation (4), and may be set by referencing a map set in advance.

The transfer torque calculating section 30i is inputted with input torque sensing transfer torque TLSD1 from the input torque sensing transfer torque calculating section 30f, and inputted with vehicle slip angular velocity correction coefficient K(dβ/dt) from the vehicle slip angular velocity correction coefficient calculating section 30g. Transfer torque TLSD2 is then calculated using equation (5) below, and outputted to the transfer torque correction/output section 30j.

$$TLSD2=K(d\beta/dt) \cdot TLSD1 \quad (5)$$

Specifically, the transfer torque calculating section 30i is provided as engaging torque calculating means.

The transfer torque correction/output section 30j receives as inputs the limited differential torque correction value TLSDS from the limited differential torque correction value calculating section 30h, and the transfer torque TLSD2 from the transfer torque calculating section 30i. Then, as shown in equation (6) below, transfer torque TLSD is calculated through correction by subtracting the limited differential torque correction value TLSDS from the transfer torque TLSD2, and outputted to the transfer clutch drive section 31.

$$TLSD = TLSD2 - TLSDS \quad (6)$$

In this way, the transfer torque correction/output section 30j is provided as control means.

Figure 3:
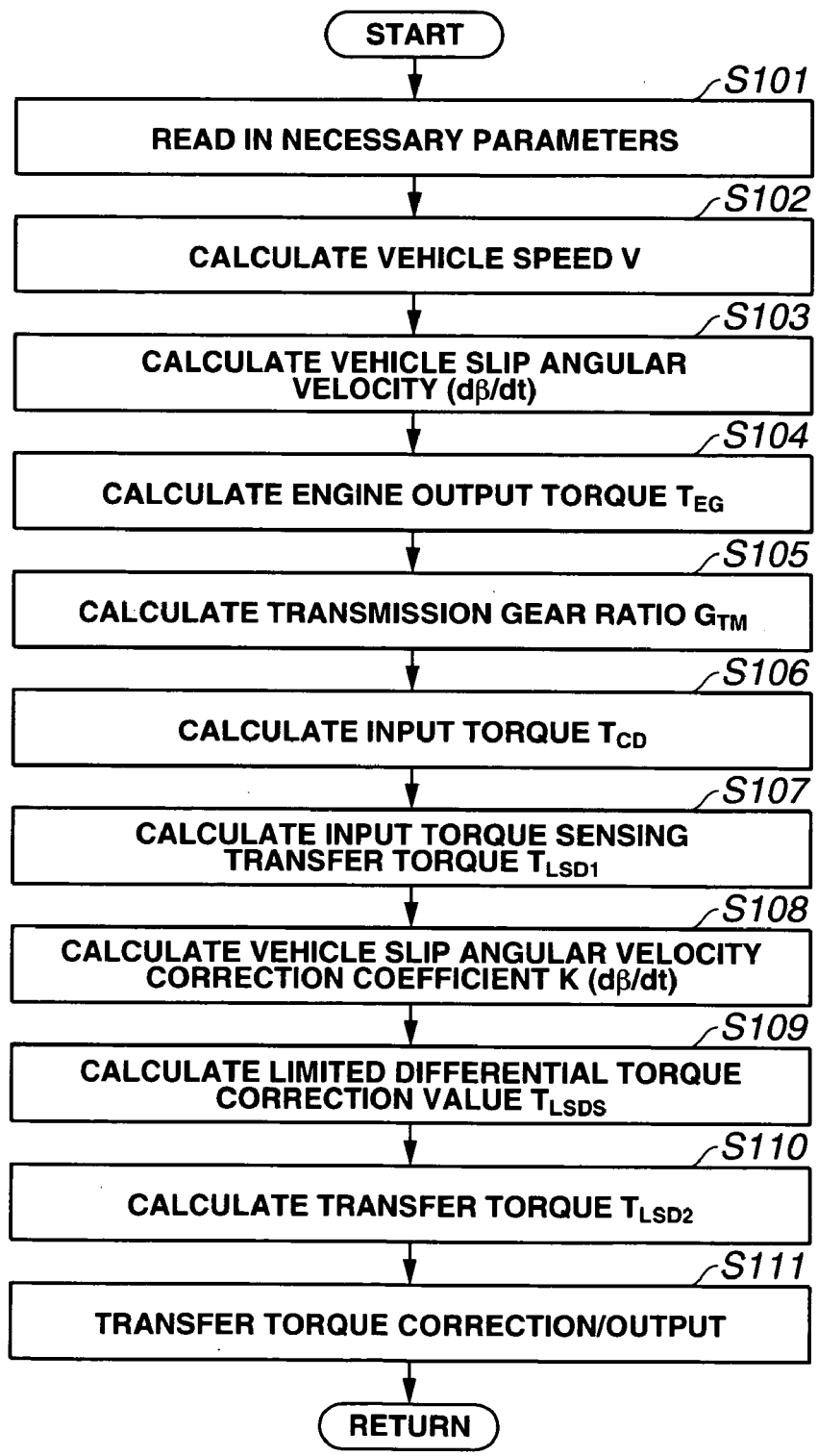
FIG. 3 is a flow chart of a drive power distribution control program.

Next, drive power distribution control executed by the above described drive power distribution control section 30 will be described with the flow chart of FIG. 3. The flowchart of FIG. 3 shows a drive power distribution control program, and first of all, in step (hereafter abbreviated to "S") 101 necessary parameters are read in, namely vehicle wheel speeds $\omega fl, \omega fr, \omega rl, \omega rr$ from the wheel speed sensors 21fl, 21fr, 21rl, 21rr, actual lateral acceleration ($d^2y/dt^2$) from the lateral acceleration sensor 22, actual yaw rate γ from the yaw rate sensor 23, accelerator opening degree θACC from the accelerator opening degree sensor 24, and engine speed NE from the engine speed sensor 25.

Next, processing advances to S102, and vehicle speed V is calculated by the vehicle speed calculating section 30a.

Processing next advances to S103 where the vehicle slip angular velocity calculating section 30b calculates vehicle slip angular velocity (dβ/dt) using equation (1) described above.

Next, processing advances to S104, where the engine output torque calculating section 30c calculates engine torque TEG by referencing a previously set engine characteristic map.

Next, processing advances to S105, where the transmission gear ratio calculating section 30d calculates transmission gear ratio GTM from previously mentioned equation (2).

Next, processing advances to S106, where the input torque calculating section 30e calculates input torque TCD from previously mentioned equation (3).

Processing then advances to step S107, where the input torque sensing transfer torque calculating section 30f calculates input torque sensing transfer torque TLSD1 by referencing a map set using previous experimentation and calculation etc.

Processing then advances to S108, where the vehicle slip angular velocity correction coefficient calculating section 30g calculates vehicle slip angular velocity correction coefficient K(dβ/dt) by referencing a map set in advance using experimentation and calculation etc.

Next, processing advances to S109, where the limited differential torque correction value calculating section 30h calculates limited differential torque correction value TLSDS from previously mentioned equation (4).

Next, processing advances to S110, where the transfer torque calculating section 30i calculates transfer torque TLSD2 from previously mentioned equation (5).

Processing the advances to S111 where the transfer torque correction/output section 30j calculates transfer torque TLSD using the previously mentioned equation (6), and the program exits.

In this way, according to the embodiment of the present invention, since a correction of the transfer torque is carried out by subtracting a limited differential torque correction value TLSDS from a transfer torque TLSD2 obtained by calculation, and the transfer clutch is controlled by the corrected transfer torque TLSD. Because the transfer torque set by the drive power distribution control section 30 constitutes an accurate value, it is possible to achieve a good balance between cornering performance and traction performance using transfer torque TLSD set by the drive power distribution control section 30.

It is conceivable that input torque sensing transfer torque TLSD1 is set in a small value in consideration of the limited torque generated by the limited slip differential mechanism 19 in advance instead of subtracting a limited differential torque from a transfer torque. For example, an incline of a map (FIG. 4) to calculate a input torque sensing transfer torque TLSD1 is set gentle. In this case, particularly in a case where vehicle slip angular velocity (dβ/dt) is large when actual lateral acceleration ($d^2y/dt^2$) is large, and if large transfer torque is required, there is a fear that necessary transfer torque can not be obtained. Accordingly, with this embodiment of the present invention, correction to subtract limited differential torque value generated by the limited slip differential mechanism 19 is carried out using subtraction in the final transfer torque correction/output section 30j, and so the above worry does not exist.

Incidentally, in the center differential unit 5 provided with the ring gear, description has been given for an example where the transfer clutch 18 and limited slip differential mechanism 19 are provided, but it is also possible to have another known center differential unit. It is also possible to not have a center differential unit if there is front and rear drive power distribution device having the transfer clutch and limited slip differential mechanism.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A front and rear drive power distribution control device for a vehicle, comprising:
   clutch means for varying drive power distribution between front and rear drive shafts;
   a limited slip differential mechanism for limiting differential action between front and rear drive shafts;
   engaging torque calculating means for calculating engaging torque of the clutch means depending on parameters representing traveling state of the vehicle;
   limited differential torque estimating means for estimating limited differential torque generated in the limited slip differential mechanism;
   control means for controlling the clutch means based on a torque value that is corrected by subtracting the limited differential torque estimated by the limited differential torque estimating means from the engaging torque calculated by the engaging torque calculating means; and
   wherein the limited differential torque estimating means estimates limited differential torque generated by the limited slip differential mechanism based on torque inputted from an engine side.

2. The front and rear drive power distribution device for the vehicle as disclosed in claim 1, wherein the engaging torque calculating means calculates engaging torque of the clutch means according to at least torque inputted from an engine side.

3. The front and rear drive power distribution device for the vehicle as disclosed in claim 2, wherein the engaging torque calculating means calculates engaging torque of the clutch means according to at least vehicle slip angular velocity.

* * * * *